United States Patent [19]

King, Jr.

[11] 4,118,849
[45] Oct. 10, 1978

[54] FASTENER WITH REMOVABLE PINTAIL AND LOCKING COLLET

[76] Inventor: John O. King, Jr., 3990 N. Ivy Rd., Atlanta, Ga. 30342

[21] Appl. No.: 829,246

[22] Filed: Aug. 30, 1977

Related U.S. Application Data

[60] Division of Ser. No. 654,756, Feb. 3, 1976, Pat. No. 4,077,299, which is a continuation-in-part of Ser. No. 542,077, Jan. 17, 1975, abandoned, and Ser. No. 542,076, Jan. 17, 1975, Pat. No. 3,962,775, and Ser. No. 542,074, Jan. 17, 1975, Pat. No. 3,965,792, and Ser. No. 554,762, Mar. 3, 1975, Pat. No. 4,012,885.

[51] Int. Cl.² .......................................... B23P 19/04
[52] U.S. Cl. ..................................... 29/240; 81/57.38
[58] Field of Search ......................... 29/240; 81/57.38

[56] References Cited

U.S. PATENT DOCUMENTS

| | | | |
|---|---|---|---|
| 2,760,393 | 8/1956 | Stough | 81/57.38 |
| 3,099,075 | 7/1973 | McDaniels et al. | 29/240 |
| 4,053,970 | 10/1977 | King | 29/240 |

Primary Examiner—James L. Jones, Jr.
Attorney, Agent, or Firm—B. J. Powell

[57] ABSTRACT

A fastener assembly for installation in holes through work pieces including an elongate fastener with a bearing section to be placed in the holes, a pintail releasably connected to the leading end of the fastener to pull the fastener into the holes, and an alignment means such as a locking collet for maintaining the pintail and fastener coaxial during the installation of the fastener.

4 Claims, 35 Drawing Figures

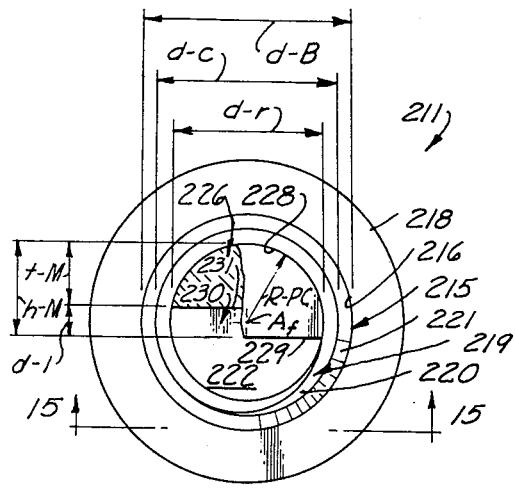
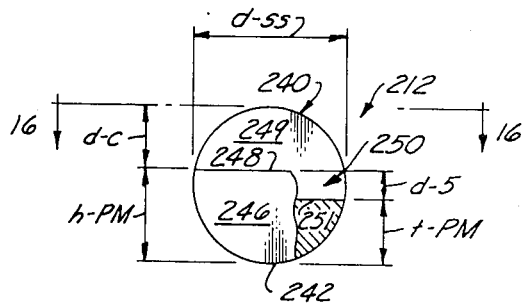
Fig 13    Fig 14
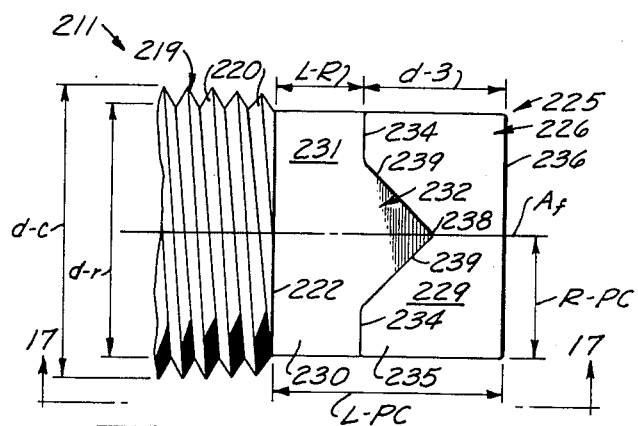
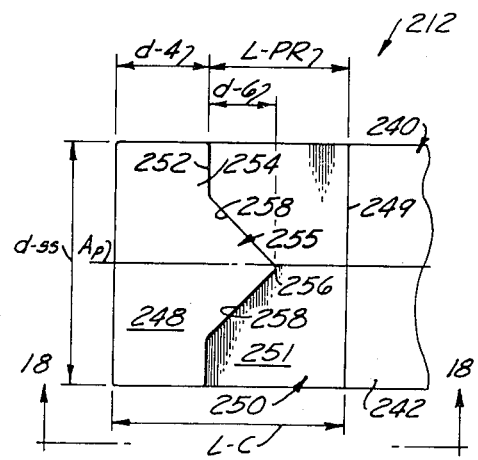
Fig 15    Fig 16
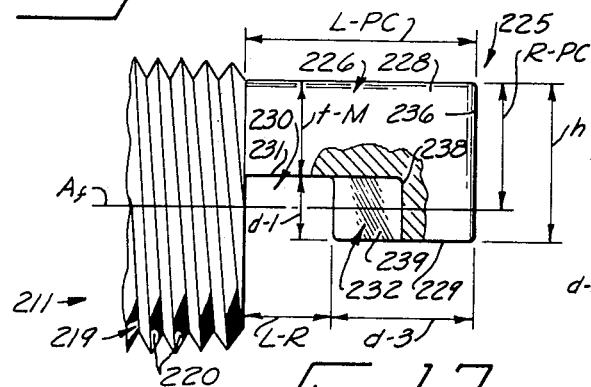
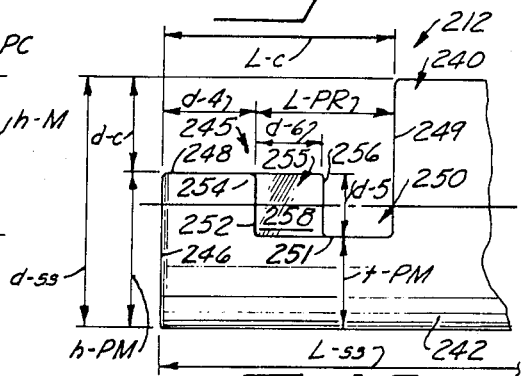
Fig 17    Fig 18

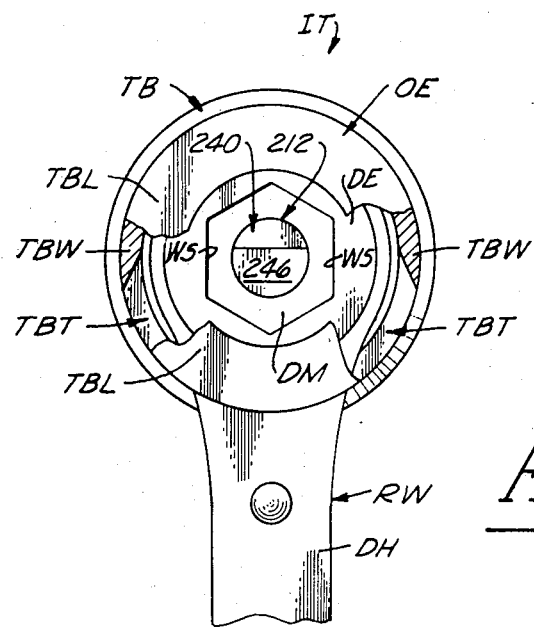
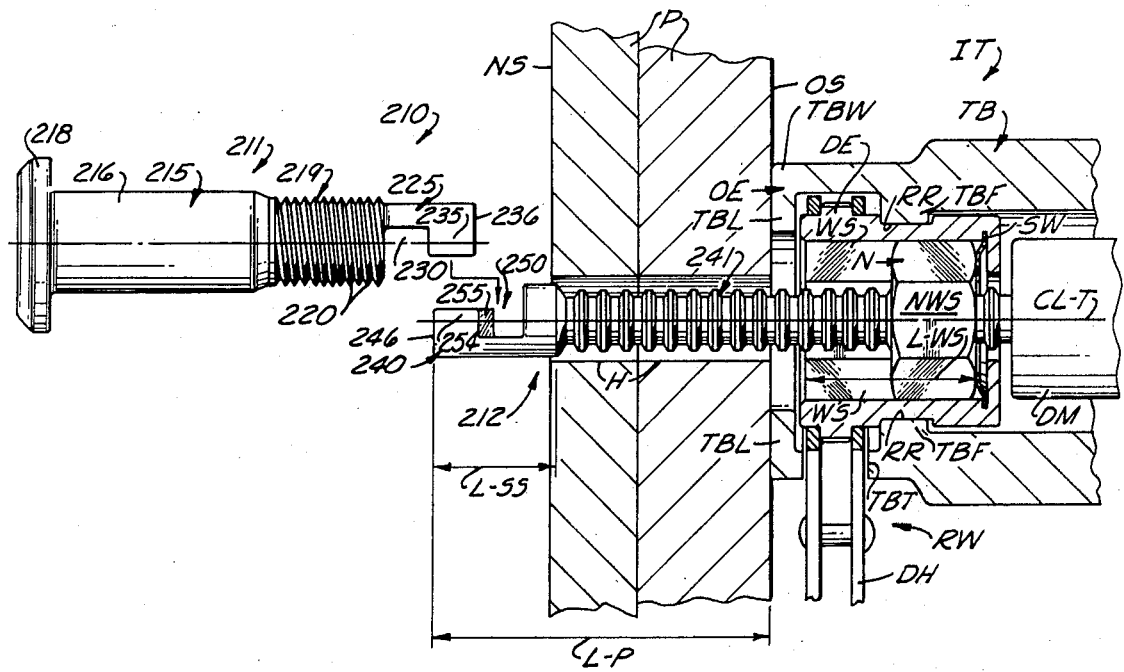

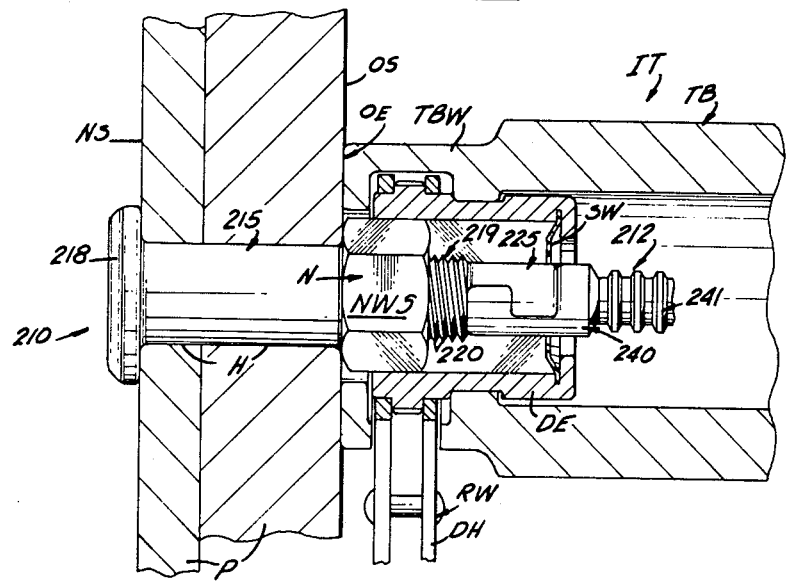
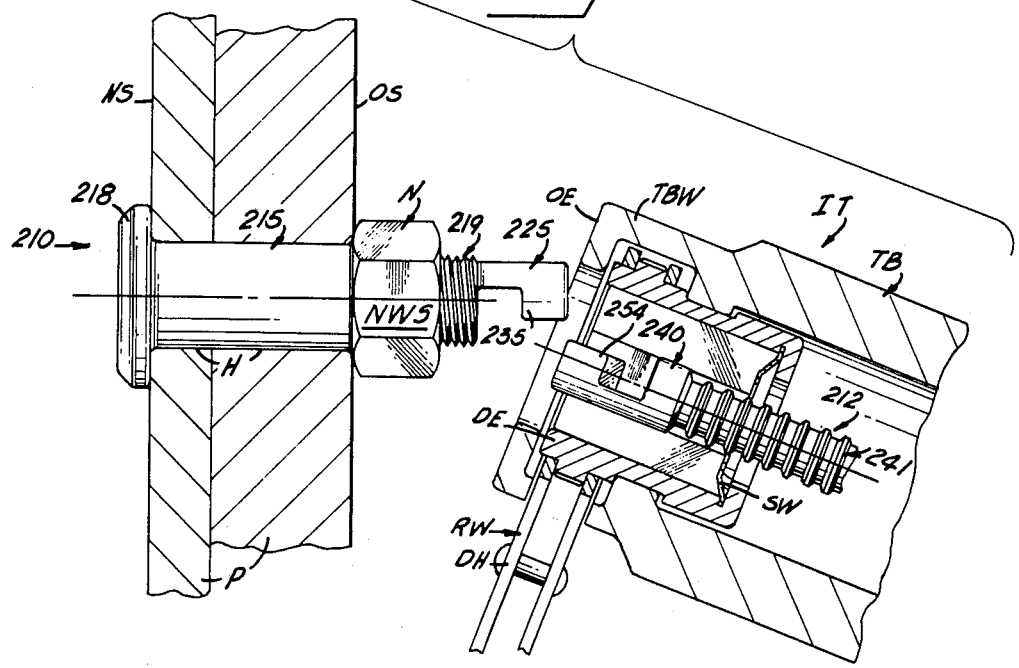

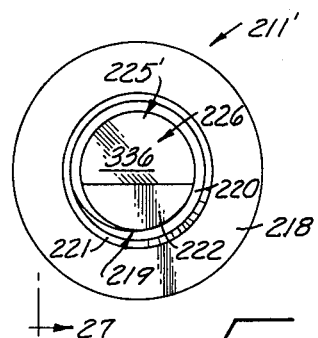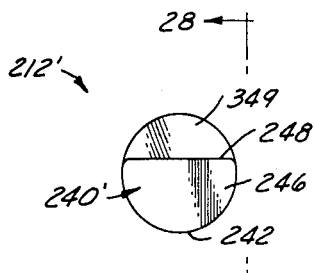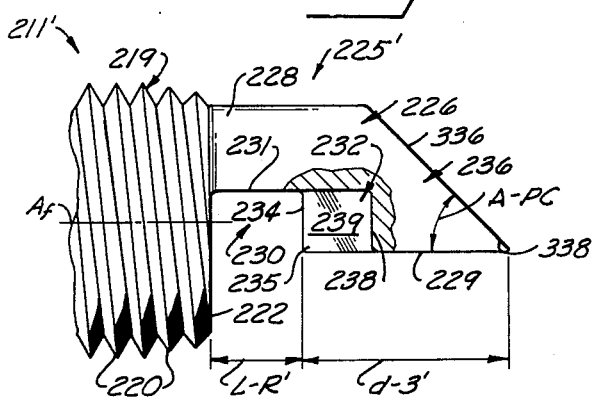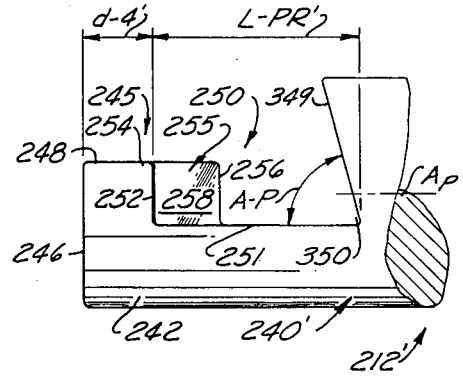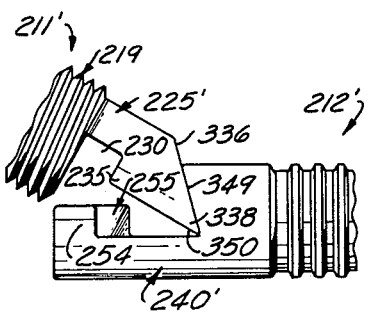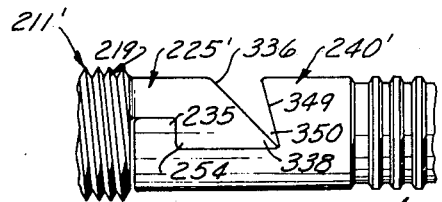

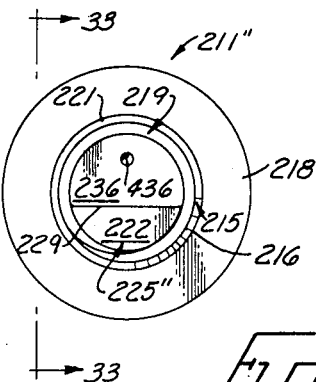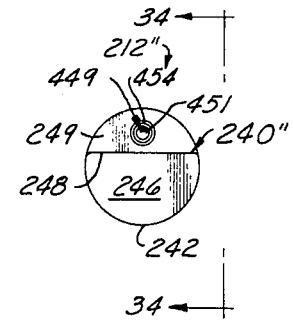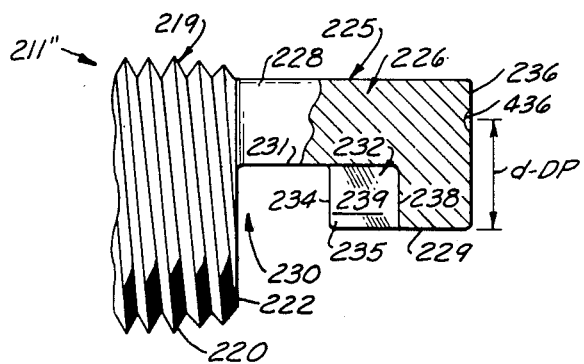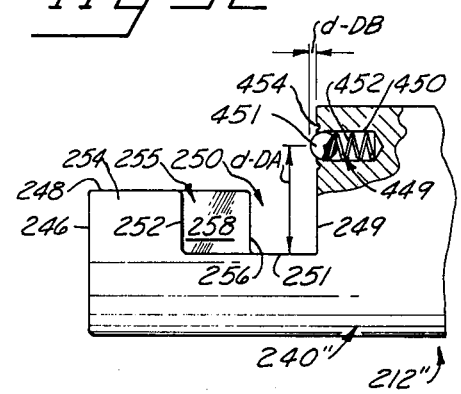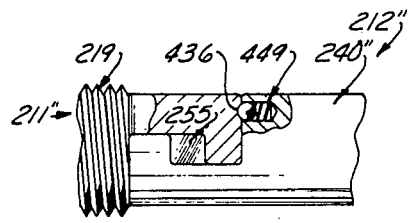

FASTENER WITH REMOVABLE PINTAIL AND LOCKING COLLET

CROSS-REFERENCE TO RELATED APPLICATIONS

This application is a division of my copending application Ser. No. 654,756 filed Feb. 3, 1976, now U.S. Pat. No. 4,077,299, which in turn is a continuation-in-part of my earlier applications Ser. No. 542,077 filed Jan. 17, 1975, now abandoned; Ser. No. 542,076 filed Jan. 17, 1975, now U.S. Pat. No. 3,962,775; Ser. No. 542,074 filed Jan. 17, 1975, now U.S. Pat. No. 3,965,792; and Ser. No. 554,762 filed Mar. 3, 1975, now U.S. Pat. No. 4,012,885.

BACKGROUND OF THE INVENTION

Fasteners such as lockbolts which have a pintail thereon for use in installing the fastener have become widely used. The pintail is normally broken from the fastener after the installation is complete and discarded. Because these pintails are not normally recovered after they are broken from the fastener proper, such pintails have resulted in a significant loss of material and money, especially when the lockbolt is manufactured out of an expensive material or when the lockbolt has large diameters and long grip lengths. One attempt to alleviate this problem is to use a pintail much shorter than the grip length of the fastener. The short pintail also has its drawbacks, especially when the lockbolt is to be installed in an interference fit. This is because the bearing section of the fastener, being larger than the initial hole diameter, must be forced into the holes by pulling on the pintail rather than simply gripping the pintail after the bearing section of the fastener is already in the holes while the collar is being swaged thereon. For interference fit, then, the pintail is required to be longer than the bearing section of the fastener which can result in an economically unfeasible amount of material being discarded each time the pintail is broken from the fastener.

SUMMARY OF THE INVENTION

These and other problems and disadvantages associated with the prior art are overcome by the invention disclosed herein by providing a pintail as part of the tooling for installing a fastener which can be selectively connected to the pintail but can be disengaged from the fastener after the fastener is in place in the holes so that the pintail can be reused. Because the pintail is saved and reused, the amount of discarded material is reduced to a minimum thus making the fastener economically feasible to use, even if the fastener is made out of expensive material or has a large working diameter and grip length. A very short connector section is provided on the leading end of the fastener to be gripped by the pintail to install the fastener and can be broken from the fastener after installation. The pintail is held in place on the connector section of the fastener during the installation of the fastener so that the pintail is coaxial with the fastener by a locking means, such as a removable collet, so that the pintail and fastener act as an integral unit during the installation of the fastener, but the pintail can be readily removed from the fastener after is is installed for reuse of the pintail.

The apparatus of the invention includes a fastener, a pintail removably connected to the leading end of the fastener, and a locking mechanism selectively fixing the pintail/fastener connection during the installation of the fastener. The locking mechanism such as a collet can be manipulated to selectively release the pintail/fastener connection so that the pintail can be removed from the fastener and re-used with other fasteners. The fastener has a bearing section which fits within the holes, a head at one end of the bearing section and a short pintail connector at the leading end of the fastener. The fastener may have an engagement section immediately leading the bearing section to be engaged by a nut or collar to hold the fastener in place. If the fastener has an engagement section, then the pintail connector will be on the leading end of the engagement section and, if the fastener has no engagement section, then the pintail connector will be on the leading end of the bearing section. The pintail removably engages the pintail connector on the fastener for use in pulling the fastener into position. The locking collet is removably carried by the pintail and the pintail connector on the fastener over the fastener/pintail connection so that this connection is locked during installation of the fastener. The pintail can be readily removed from the fastener after the fastener is in place in the holes through the work pieces by moving the locking collet from over the fastener/pintail connection to release the connection. The locking collet may also have an expansion surface thereon to enlarge the hole through the work pieces as it is forced therethrough. This expansion surface can be used to insure that the hole is properly sized for the fastener and can non-elastically expand the hole to coldwork it as well.

These and other features and advantages of the invention disclosed herein will become more clearly understood upon consideration of the following specification and accompanying drawings wherein like characters of reference designate corresponding parts throughout the several views and in which:

BRIEF DESCRIPTION OF THE DRAWINGS

FIG. 13 is an enlarged leading end view of the fastener of FIG. 12;

FIG. 14 is an enlarged trailing end view of the pintail of FIG. 12;

FIG. 15 is a partial enlarged view of the leading end of the fastener of FIG. 13 taken generally along line 15—15 in FIG. 13;

FIG. 16 is a partial enlarged view of the trailing end of the pintail of FIG. 14 taken along line 16—16 in FIG. 14;

FIG. 17 is a side elevational view taken along line 17—17 in FIG. 15;

FIG. 18 is a side elevational view taken along line 18—18 in FIG. 16;

FIG. 19 is an operating end view of the installation tool seen in FIG. 12;

FIG. 20 is a view similar to FIG. 12 showing the initial step in installing the fastener with the installation tool in longitudinal cross-section;

FIG. 23 is a view similar to FIG. 20 showing the fourth step in installing the fastener;

FIG. 24 is a view similar to FIG. 20 showing the fifth step in installing the fastener;

FIG. 25 is a leading end view of a fastener similar to that of FIG. 13 showing a modified alignment means;

FIG. 26 is a trailing end view of a pintail for use with the fastener of FIG. 25;

FIG. 27 is a partial enlarged side elevational view taken along line 27—27 in FIG. 25 of the leading end of the fastener;

FIG. 28 is a partial enlarged side elevational view taken along line 28—28 in FIG. 26 of the trailing end of the pintail;

FIG. 29 is a view of the fastener and pintail shown in FIGS. 25-28 being engaged;

FIG. 30 is a view showing the fastener and pintail of FIGS. 25-29 engaged;

FIG. 31 is a leading end view of a fastener similar to that of FIG. 13 showing a second modified alignment means;

FIG. 32 is a trailing end view of a pintail for use with the fastener of FIG. 31;

FIG. 33 is a partial enlarged side elevational view taken along line 33—33 in FIG. 31 of the leading end of the fastener;

FIG. 34 is a partial enlarged side elevational view taken along line 34—34 in FIG. 32 of the trailing end of the pintail; and, FIG. 35 is a view of the fastener and pintail shown in FIGS. 31-34 engaged for installation in work pieces.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 9:
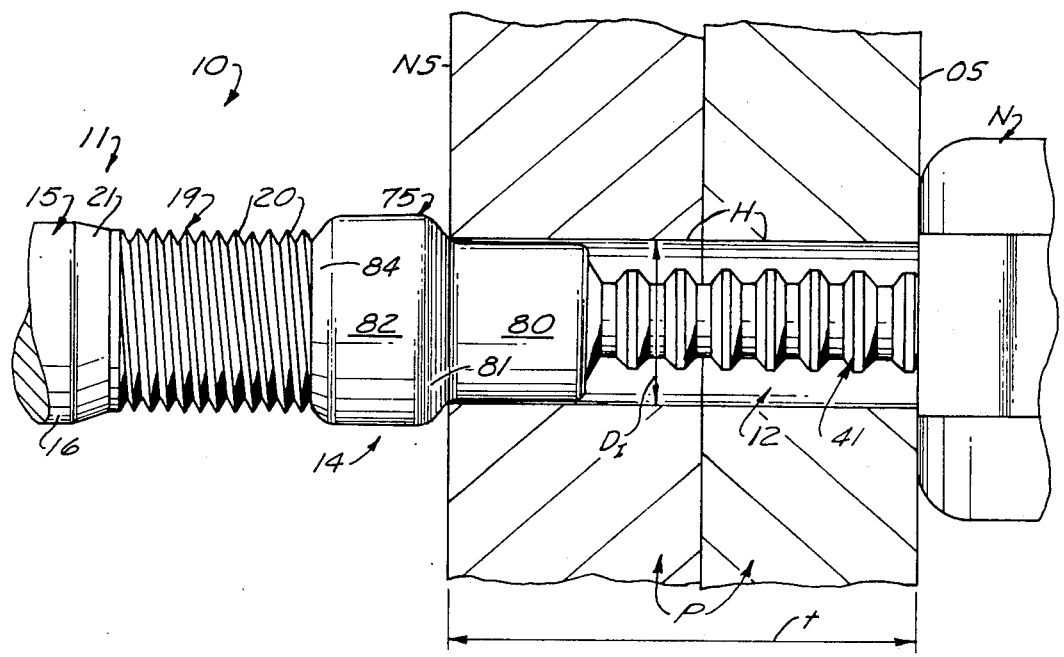
FIG. 9 is a view similar to FIG. 1 showing the invention ready for use.
Figure 10:
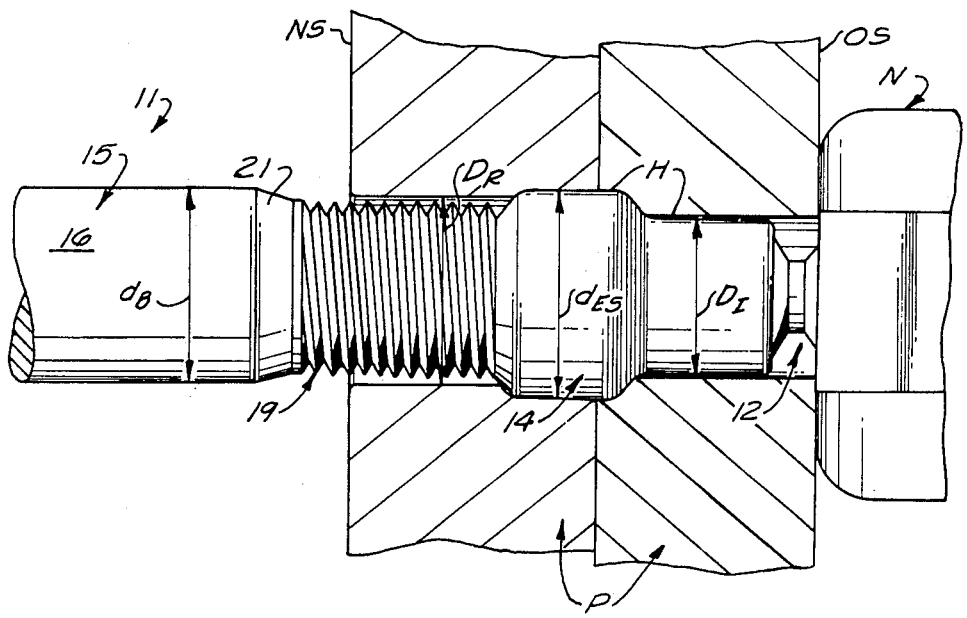
FIG. 10 is a view similar to FIG. 9 showing the invention being used.

Referring to FIGS. 1-7, a first embodiment of the invention is illustrated and is designated generally as fastener assembly 10. The fastener assembly 10 includes generally a fastener 11, a pintail 12 releasably connected to the leading end of the fastener 11, and a locking collet 14 slidably received over the connection between the fastener and the pintail to fix the fastener/pintail connection. The fastener 11 can be pulled through holes H in work pieces P using the pintail 12 as illustrated in FIGS. 9 and 10.

The fastener 11 has a bearing section 15 defining a bearing surface 16 of diameter $d_B$ on the outside thereof concentric about the fastener axis $A_f$. The bearing section 15 has a nominal grip length $L_1$ which corresponds to the total thickness T of the work pieces P seen in FIG. 9 as is normally associated with fasteners. The trailing end of the bearing section 15 has an enlarged head 18 thereon adapted to engage one side of the work pieces P when the fastener is in place in the holes H. The leading end of the bearing section 15 is provided with an engagement section 19 also centered on the axis $A_f$ coaxial with bearing section 15 which is adapted to be engaged by a conventional holding device to lock the fastener in place in the work pieces P. While different kinds of engagement sections 19 may be used, the particular engagement section 19 illustrated in FIGS. 1-4 is threaded with threads 20 to receive a conventional nut thereon. The threads 20 have a crest diameter $d_{TC}$ seen in FIG. 3 slightly less than the bearing diameter $d_B$ as is normally associated with standard threaded fasteners. A tapered transition surface 21 on the leading end of the bearing section 15 provides for a smooth transition between diameters $d_{TC}$ and $d_B$. The threads 20 also have a root diameter $d_{TR}$ also seen in FIG. 3 with threads 20 having a standard shape.

Figure 3:
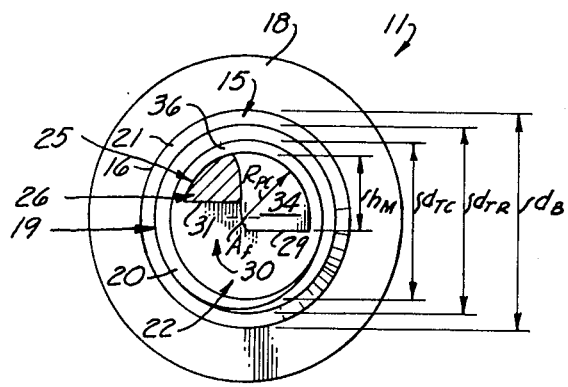
FIG. 3 is a leading end view of the fastener of FIG. 1 shown partly in cross-section.
Figure 5:
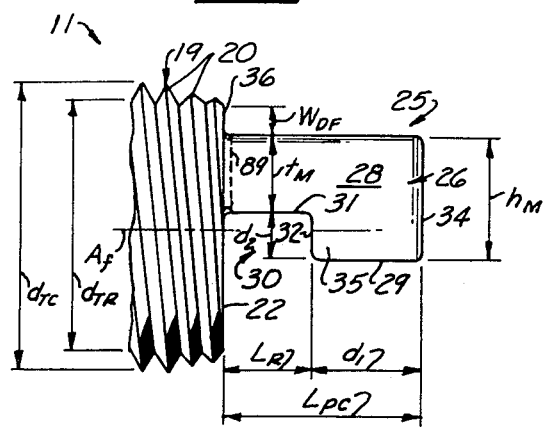
FIG. 5 is an enlarged side elevational view of the pintail connector on the fastener.

The leading end 22 of the engagement section 19 is provided with a pintail connector 25 that provides a means by which the fastener 11 can be releasably connected to the pintail 12. The pintail connecter 25 is best seen in FIGS. 3 and 5 includes a generally semi-cylindrical body 26 defining an arcuate peripherial support surface 28 thereon having a radius $R_{PC}$ centered on axis $A_f$ so that the surface 28 is coaxial with axis $A_f$. The opposite ends of the arcuate surface 28 are joined by a flat surface 29 which lies along a chord of the cylinder defined by the radius $R_{PC}$ so that the longitudinal axis of surface 29 is generally parallel to the fastener axis $A_f$. The surface 29 is located so that the maximum height $h_M$ between flat surface 29 and arcuate surface 28 when measured perpendicular to surface 29 is greater than the radius $R_{PC}$ as will become more apparent. The body 26 has a length $L_{PC}$ also to become more apparent. Body 26 also has a transversely extending recess 30 thereacross which opens onto the flat surface 29. Recess 30 has a bottom edge 31 generally parallel to the flat surface 29 and a leading push edge 32 extending from the flat surface 29 to the bottom edge 31 and forming a shoulder 35 on body 26. The push edge 32 is located a distance $d_1$ rearwardly of the leading end 34 of body 26 and the recess 30 has a depth $d_2$ so that that portion of body 26 spanning the recess 30 has a maximum thickness $t_M$ when measured perpendicular to bottom edge 31 of recess 30. The recess 30 has a length $L_R$ such that the rear edge of the recess 30 is the leading end 22 of the engagement section 19. The trailing end of body 26 is integral with the leading end 22 of engagement section 19. The radius $R_{PC}$ is less than one-half the thread root diameter $d_{TR}$ so that an annular driving face 36 is defined on the leading end 22 of engagement section 19 between the arcuate surface 28 on body 26 and the root of the leading thread 20. Driving face 36 has an effective width $w_{DF}$ as will become more apparent.

Figure 1:
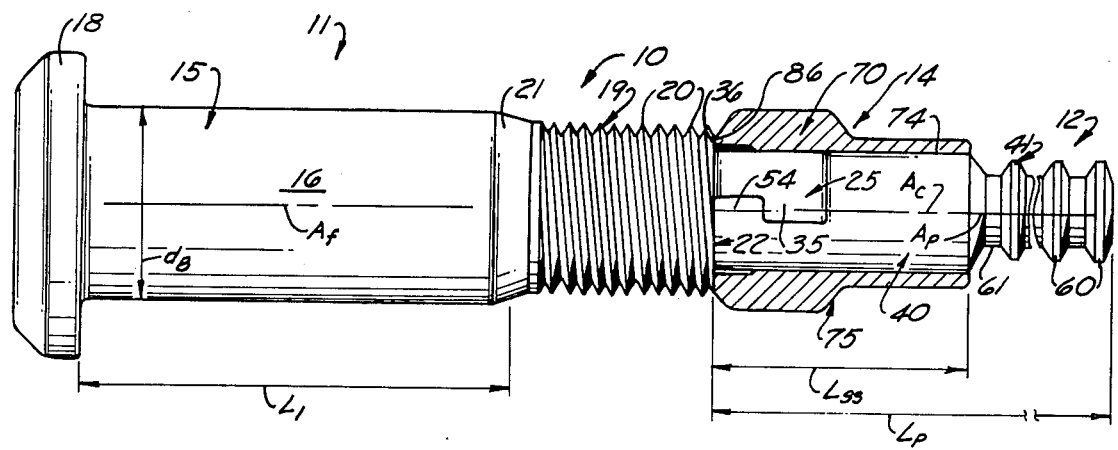
FIG. 1 is an assembled side elevational view shown partly in cross-section of one embodiment of the invention.
Figure 4:
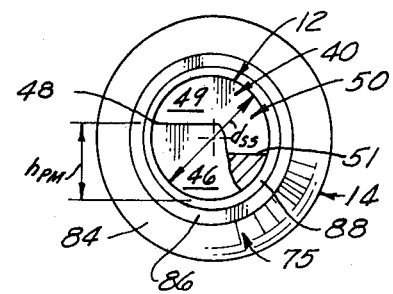
FIG. 4 is a trailing end view of the pintail of FIG. 1 shown partly in cross-section with the locking collet thereon.
Figure 6:
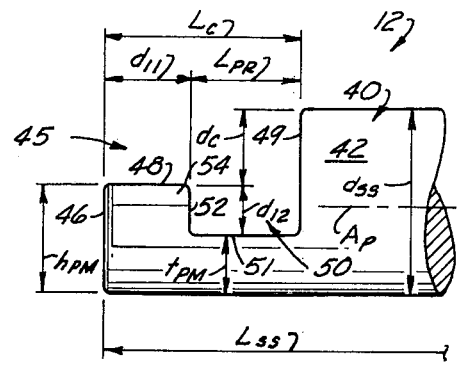
FIG. 6 is an enlarged side elevational view of the trailing end of the pintail.

The pintail 12 is an elongate and generally cylindrical member with a central axis $A_p$. The pintail 12 as best seen in FIGS. 1, 4 and 6 has a generally cylindrical support section 40 at its trailing end and a pulling section 41 at its leading end which can be engaged by a lockbolt installation gun to pull the pintail through the holes of the work pieces as will become more apparent. The overall length $L_p$ of the pintail 12 is greater than the thickness of the work pieces as will become more apparent so that the leading end of the pintail will project through the holes in the work pieces prior to installation. The support section 40 of the pintail 12 is a cylindrical section defining a generally cylindrical peripheral support surface 42 thereon with a diameter $d_{SS}$ substantially equal to twice the radius $R_{PC}$ of the surface 28 on the pintail connector 25. The support section 40 has length $L_{SS}$ which is sufficient to support the collet 14 as will become more apparent. The trailing end of the support section 40 is provided with a cutout 45 which extends forwardly from the trailing end 46 of the section 40. The cutout 45 has a length $L_C$ substantially equal to the length $L_{PC}$ of the pintail connector 25 as will become more apparent. The cutout 45 has a depth $d_C$ substantially equal to the maximum thickness $t_M$ of that portion of the pintail connector 25 spanning the recess 30. Cutout 45 defines a generally flat inside surface 48 on the support section 40 which lies along a chord of the support section 40 so that the longitudinal axis of surface 48 is generally parallel to the pintail axis $A_p$. The surface 48 is located so that the maximum height $h_{PM}$ between the flat surface 48 and the cylindrical surface 42 when measured perpendicular to surface 48 is greater than one-half of the diameter $d_{SS}$ of the support section 40. A transversely extending recess 50 is provided across the support section 40 and opens onto the flat surface 48. The recess 50 has a bottom edge 51 generally parallel to the flat surface 48 and a trailing pull edge 52 extending from the flat surface 48 to the bottom edge 51 and forming a shoulder 54 on the support section 40 adjacent the flat surface 48. The pull edge 52 is located a distance $d_{11}$ forwardly of the trailing edge 46 of the support section 40 and the recess 50 has a depth $d_{12}$ so that that portion of the support section 40 spanning the recess 50 has a maximum thickness $T_{PM}$ measured perpendicular to the bottom edge 51 of the recess 50. The recess 50 has a length $L_{PR}$ such that the leading edge of the recess 50 is a continuation of surface 49 at the leading end of the cutout 45. The surface 49 is perpendicular to the pintail axis $A_p$.

When the shoulder 54 on the support section 40 of the pintail 12 is inserted into the recess 30 on the pintail connector 25 as seen in FIG. 1, the push edge 32 on the connector 25 will be aligned with the pull edge 52 on the pintail 12 so that the fastener 11 can be pulled into position in holes through work pieces by pulling on the pintail 12. In this position, it will be noted that the cylindrical surface 42 on the support section 40 of the pintail 12 forms a continuation of the support surface 28 on the pintail connector 25 so that the resulting combination has an effective diameter $d_{SS}$ over which the collet 14 can be slidably received as will become more apparent.

The pull section 41 on the pintail 12 as seen in FIG. 1 is provided with an appropriate configuration to be gripped by a lockbolt installation gun to pull the pintail 12 through holes in work pieces. While different configurations may be used, the pull section 41 illustrated defines pulling lands 60 and pulling grooves 61 thereon adapted to be gripped by a conventional nose assembly on a lockbolt installation gun as will become more apparent.

Figure 7:
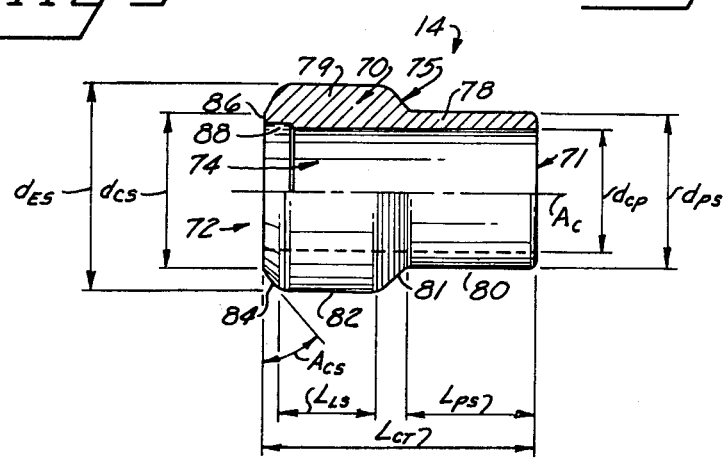
FIG. 7 is a side elevational view of the locking collet shown partly in cross-section.

The locking collet 14 as best seen in FIGS. 4 and 7, includes a seamless annular side wall 70 concentrically arranged about a central axis $A_c$ with a length $L_{CT}$ normally about the same as the length $L_{SS}$ of the support section 40 of pintail 12. The collet 14 has a leading end 71 and a trailing end 72. Side wall 70 defines a cylindrical central passage 74 therethrough concentric about axis $A_c$ with a diameter $d_{CP}$ which is just sufficient for collet 14 to be slidably received onto the support surface 42 of pintail 12 and support surface 28 of pintail connector 25 and be in bearing support thereon. The diameter $d_{CP}$ is usually no more than 0.001 inch greater than diameter $d_{SS}$ of support surface 42. The side wall 70 defines a peripheral surface 75 thereon concentric about axis $A_c$ which may have a number of different shapes depending on its final use. For instance, the surface 75 may be cylindrical with a diameter less than the holes through the work pieces so that collet 14 simply locks the pintail 14 onto the pintail connector 25 of fastener 11 when the shoulders 35 and 54 are engaged and collet 14 slipped over this connection as seen in FIG. 1. On the other hand, the surface 75 may be shaped to expand the holes through the work pieces in addition to locking the pintail onto the pintail connector. This latter shape is the shape illustrated herein and will be explained in detail.

Figure 2:
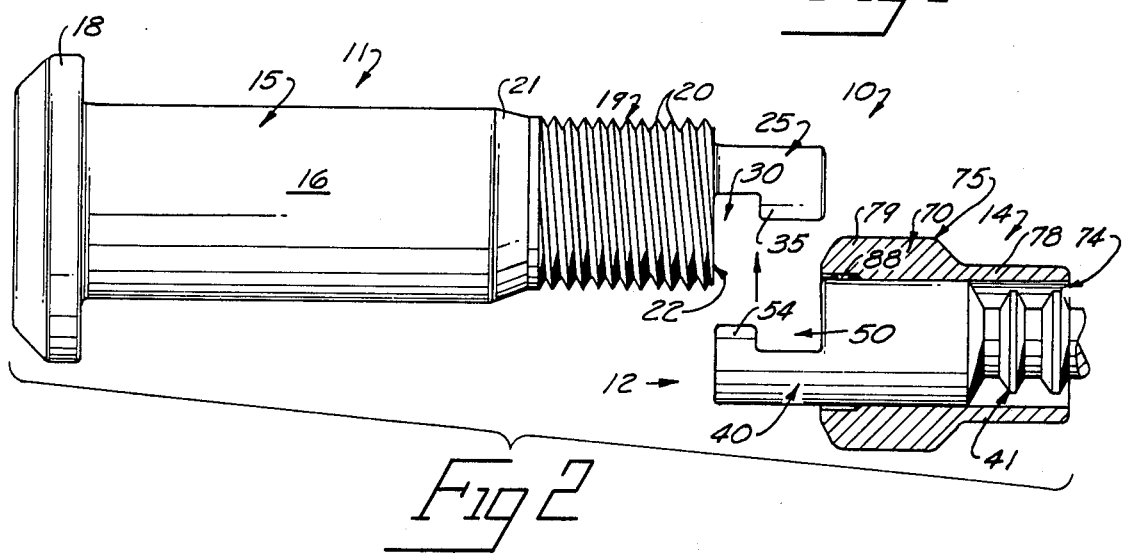
FIG. 2 is a view similar to FIG. 1 with the fastener and pintail separated.

As seen in FIGS. 1, 2 and 6 the side wall 70 includes a leading pilot section 78 and a trailing expansion section 79. The pilot section 78 defines a cylindrical pilot subsurface 80 of surface 75 on the outside thereof concentric about the collet central axis $A_c$. Pilot surface 80 has a length $L_{PS}$ and a diameter $d_{PS}$ sufficient to locate the collet 14 coaxially with the centerline of the holes through the work pieces as will become more apparent when subsurface 80 extends into the holes. Normally, diameter $d_{PS}$ of pilot subsurface 80 is in the order of 0.001 inch less than the initial diameter of the holes through the work pieces as will become more apparent.

Expansion section 79 includes a leading expansion subsurface 81, an intermediate land subsurface 82, and a trailing contraction subsurface 84 of surface 75, all concentric about the central axis $A_c$ of collet 14. The expansion subsurface 81 tapers outwardly from the diameter $d_{PS}$ of pilot section 78 to a trailing major diameter $d_{ES}$ where the major diameter $d_{ES}$ is greater than the initial diameter of the holes through the work pieces by that amount which it is desired to expand holes. If cold-working is desired, diameter $d_{ES}$ is usually 2-10% greater than the initial hole diameter depending on the material of the work pieces and the final diameter desired as will become more apparent. The land subsurface 82 is cylindrical with the major expansion diameter $d_{ES}$ and joins with the trailing end of expansion subsurface 81. The land subsurface 82 has a convenient length $L_{LS}$ which allows the expansion subsurface 81 to be reground without reducing the major expansion diameter $d_{ES}$. It will be noted that the length of the land subsurface 82 will be shortened slightly each time the expansion subsurface 81 is reground. The trailing contraction subsurface 84 joins with the trailing end of the land subsurface 82 and tapers inwardly from the diameter $d_{ES}$ to a smaller diameter $d_{CS}$. The diameter $d_{CS}$ is at least as small as the root diameter $d_{RT}$ of threads 20 on fastener 11 to prevent damage to threads 20 when the fastener 11 is pulled into the holes through the work pieces. The contraction subsurface 84 also angles outwardly from a plane normal to axis $A_c$ at a clearance angle $A_{CS}$ to insure that the leading threads 20 on fastener 11 will not be distorted when the fastener 11 and collet 14 are forced through the holes in the work pieces as will become more apparent. While angle $A_{CS}$ may be varied, an angle of 5°–15° has been found sufficient. The juncture of subsurfaces 80, 81, 82 and 84 with each other are smoothly rounded as will become more apparent.

The trailing end of the side wall 70 defines a rearwardly facing abutment face 86 concentrically located about the collet axis $A_c$ and lying in a plane normal to axis $A_c$. The face 86 joins with the contraction subsurface 84 about its periphery and thus has an outside diameter $d_{CS}$. The abutment face 86 is engaged by the leading driving face 36 on fastener 11 to force the collet 14 through the holes through the work pieces as will become more apparent.

The collet 14 may be provided with a clearance counterbore 88 as best seen in FIGS. 1 and 7 at the trailing end of passage 74 to provide a clearance over the juncture of the pintail connector 25 and the leading end of the engagement section 19 of fastener 11. This prevents the collet 14 from sticking on the fastener 11 when the assembly is forced through the holes in the work pieces.

A breakneck groove 89 may be formed in the pintail connector 25 at its juncture with the leading end of the engagement section 19 of fastener 11 as shown by dashed lines in FIG. 5 to facilitate the removal of the pintail connector 25 after fastener 11 is installed. The counterbore 88 on collet 14 would also provide clearance over the breakneck groove 89.

Figure 8:
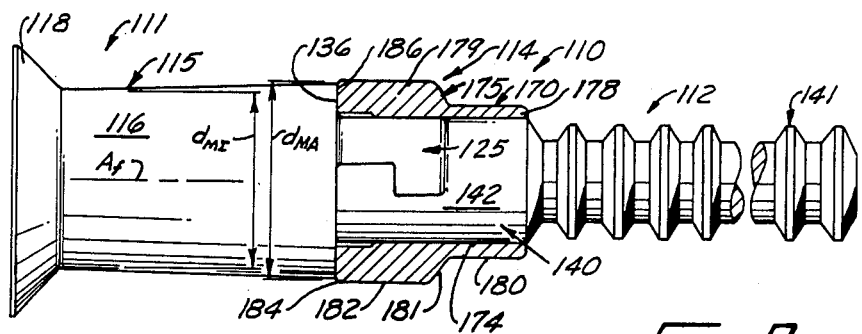
FIG. 8 is an assembled side elevational view of a modification of the first embodiment of the invention.

Referring to FIG. 8, a second embodiment of the invention is illustrated and is designated generally as fastener assembly 110. The fastener assembly 110 includes generally a fastener 111, a pintail 112 releasably connected to the leading end of the fastener 111, and a locking collet 114 slidably received over the connection between the fastener and pintail to fix the fastener/pintail connection. The fastener assembly 110 is used similarly to the fastener assembly 10 with the fastener 111 being pulled through holes in work pieces using the pintail 112.

The fastener 111 corresponds generally to the fastener 10 except that the bearing section 115 of the fastener 111 has a reverse taper from its leading end toward its trailing end similar to that disclosed in my co-pending application, Ser. No. 554,762. The bearing section 115 defines an external bearing surface 116 thereon which is concentrically arranged about the axis $A_f$ and tapers inwardly uniformly from the leading end of the bearing section toward the trailing end thereof. The leading end of the bearing surface 116 has a major prescribed diameter $d_{MA}$ and the trailing end of the surface 116 has a minimum prescribed diameter $d_{MI}$ at its trailing end. The function of the reverse taper on the bearing surface 116 serves to retain the fastener in position in the work pieces without the use of a locking device as is fully disclosed in my co-pending application Ser. No. 554,762 which is incorporated herein by reference. Since the fastener 111 has no engagement section thereof, the pintail connector 125 is integral with the leading end of the bearing section 115 and a driving face 136 arranged normal to the axis $A_f$ is provided at the leading end of the bearing section 115 about connector 125. The head 118 of the fastener 111 illustrated is of the countersunk type, however, it is to be understood that heads similar to head 18 on fastener 11 may be used.

The pintail 112 has the same construction as the pintail 12 and has corresponding reference numbers applied thereto displaced by 100. The collet 114 is similar to the collet 14 with the major difference being that the rearwardly facing driven face 186 thereon has a larger outside diameter thus making the contraction surface 184 narrower than the contraction 84 on the collet 14. It will be noted that the outside diameter of the driven face 186 on collet 114 is at least as large as the leading diameter $d_{MA}$ of the bearing section 115 to prevent the outside corner of the leading end of the bearing section 115 from damaging the inside of the holes through the work pieces as the fastener is installed. The rest of the expansion section 179 of collet 114 and the pilot section 178 are the same as the collet 14. The fastener assembly 110 is assembled and used similarly to the fastener assembly 10.

OPERATION

Figure 11:
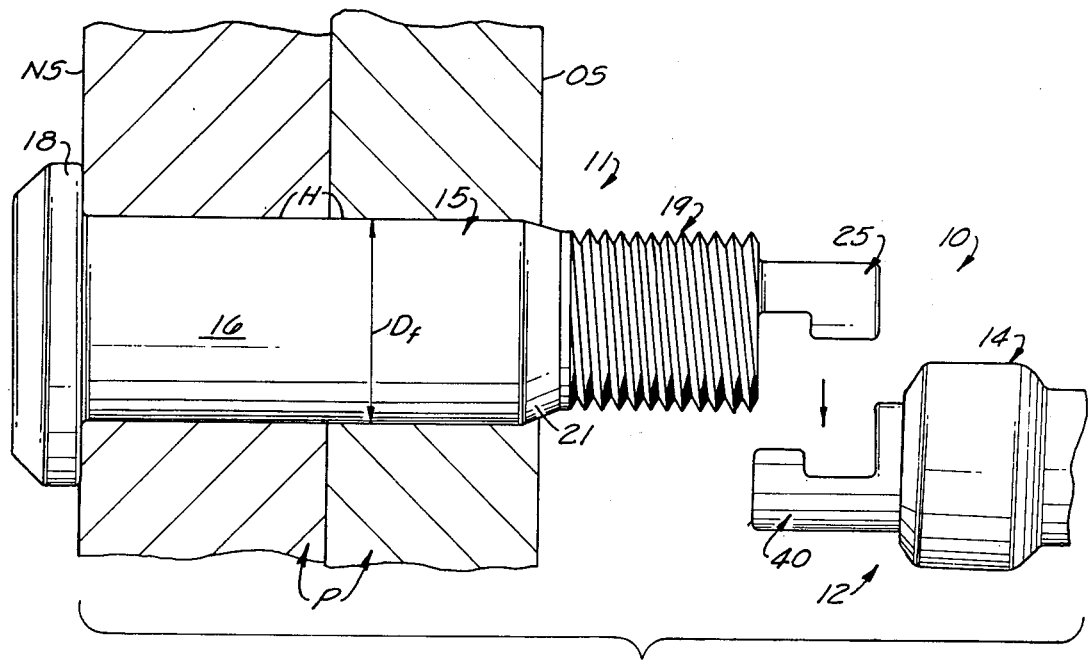
FIG. 11 is a view similar to FIG. 10 showing the fastener fully seated in the holes.

Referring to FIGS. 9-11, the operation of the invention will become more apparent. Usually, the fastener assembly 10 will be assembled as shown in FIG. 1 by hooking the shoulder 54 on the pintail 12 behind the shoulder 35 on the fastener 11 and then sliding the collet 14 thereover so that the shoulders 54 and 35 are maintained in engagement with each other. The assembly 10 is then inserted through the holes H in work pieces P as seen in FIG. 9 until the pilot section 78 on the collet 14 lies within the holes H on the near side NS of the work pieces and the leading end of the pull section 41 of the pintail 12 projects out of the holes on the off side OS of the work pieces P. A nose assembly N of a conventional lockbolt installation gun (not shown) is then inserted on the pull section 41 of the pintail 12 from the off side of the work pieces. If space is critical, the pintail 12 may be partially inserted in the holes while it is disengaged from the fastener 11 and with the collet 14 thereon in the position shown in FIG. 2. Then the pintail connector 25 on the fastener 11 is hooked onto the pintail 12 and the collet 14 slipped over the connection to hold it in place.

The lockbolt installation gun is then activated to cause the nose assembly N to pull the pintail 12 toward the nose assembly N thus forcing the expansion section 79 of the collet 14 through the holes. This causes the holes H to be expanded from the initial diameter $D_I$ shown in FIG. 9 out to the major expansion diameter $d_{ES}$ of the expansion section 79 as the collet 14 passes through the holes. Because the material of the work pieces about the holes exerts an inward compressive force on the material immediately adjacent the holes after expansion, the material about the holes recovers somewhat along the contraction subsurface 84 on the collet 14 to a recovered diameter $D_R$ as seen in FIG. 10. Usually, the diameter $d_{ES}$ of the collet 14 is selected so that this recovered diameter $D_R$ of the holes H is larger than the thread crest diameter $d_{TC}$ so that the threads 20 on the engagement section 19 of the fastener 11 will not strike the hole surface as the fastener 11 is pulled into position. Normally, where interference fit is desired, the recovered diameter $D_R$ of the holes H will be less than the diameter $d_B$ of the bearing section 15 of fastener 11. This causes the holes H to be re-expanded back out to the diameter $d_B$ of the bearing section 15 by the transition surface 21 on the leading end of the bearing section 15 to the final hole diameter $D_f$ as seen in FIG. 11.

When the fastener 11 is fully seated, the collet 14 can be slipped from over the fastener/pintail connection and the pintail 12 and collet 14 removed from the pintail connector 25 on the fastener 11, as seen in FIG. 11. The installation of the fastener 11 will then be completed by engaging the engagement section 19 with an appropriate locking device such as a conventional nut or locking collar. It will be understood that the fastener 11 may be held by the pintail connector 25 during this final installation step and further that an appropriate device may be applied to the pintail connector 25 to axially preload the fastener 11 during this final installation step.

It will be noted that the pintail 12 and the collet 14 may be reused and very little material is discarded when the pintail connector 25 is removed. The pintail connector 25 may be removed by a lateral blow or some other technique and this removal may be facilitated by the breakneck groove 89 shown in FIG. 5. It can now be appreciated that the thickness $t_M$ of the pintail connector 25 and the thickness $t_{PM}$ of the support section 40 on the pintail 12 are selected so that the strength of the fastener/pintail connection is sufficiently strong to pull the fastener 11 into position in in the work pieces while expanding the holes with the collet 14. It is also to be appreciated that the relative dimensions of the connection between the pintail connector 25 and the support section 40 of pintail 12 may be varied since the fastener 11 and pintail connector 25 may be made out of one strength material while the pintail 12 may be made out of another strength material.

The fastener assembly 110 would be installed in a similar manner to that just described except that the installation would be complete when the fastener 111 is fully seated in the holes through the work pieces. It will also be appreciated that the recovered diameter of the holes would normally be less than at least the major diameter $d_{MA}$ of the bearing section 115 so that the work pieces would grip the bearing surface 116 to hold the fastener 111 in place.

SECOND EMBODIMENT OF THE INVENTION

As the effective diameter of a fastener reaches the smaller sizes such as 3/16 inch and less, it is extremely difficult to make the pintail sufficiently smaller than the effective diameter of the fastener to mount a locking collet thereon. The second embodiment of the fastener assembly designated 210 in FIG. 12 is designed for such application in which the fastener 211 is held coaxial with the pintail 212 without the use of a locking collet.

Figure 12:
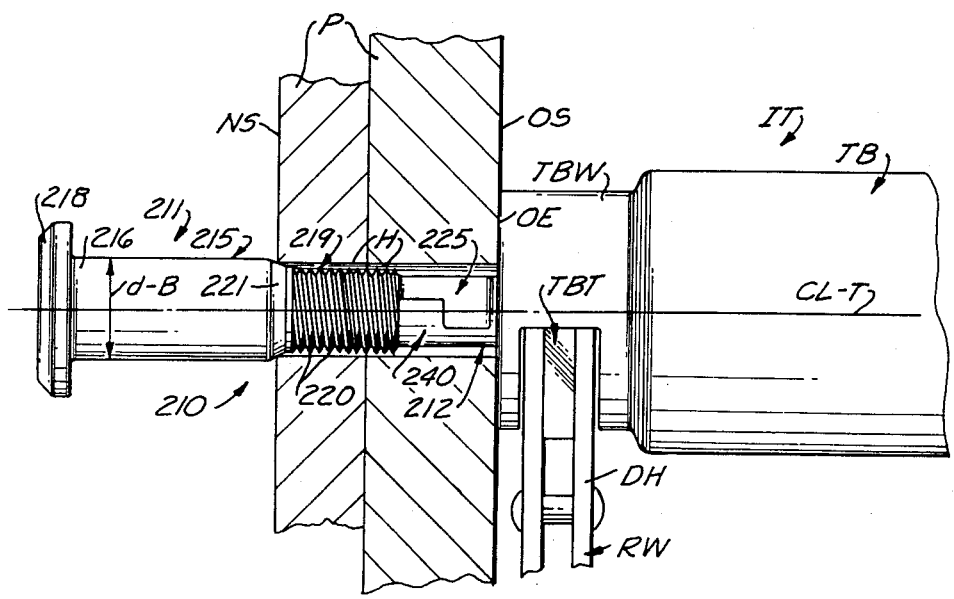
FIG. 12 is a side elevational view of a second embodiment of the invention shown in position to be installed.

The fastener 211 in FIG. 12 is similar to fastener 11 in that it has a bearing section 215 with bearing surface 216 of diameter $d$-B about axis $A_f$ and grip length L-1. It will be noted that diameter $d$-B is usually smaller than that of fastener 11. An enlarged heat 218 is provided at one end of bearing section 215 and an engagement section 219 is provided at the other end of bearing section 215 which may be threaded with threads 220. Threads 220 have a crest diameter $d$-c and a root diameter $d$-r seen in FIGS. 13, 15 and 17 where diameter $d$-c is slightly smaller than diameter $d$-B so that tapered transition surface 221 connects section 219 with surface 216.

The leading end 222 of engagement section 219 is provided with pintail connector 225 similar in shape to connector 25 on fastener 11. The connector 225 has a semi-cylindrical body 226 as seen in FIGS. 12, 13, 15 and 17 defining arcuate peripheral surface 228 with radius R-PC centered on axis $A_f$ so that the effective diameter of surface 228 is approximately equal to the root diameter $d$-r of threads 20 unlike that of connector 25 on fastener 11. The opposite ends of surface 228 are joined by flat surface 229 lying along a chord of surface 228. The surface 229 is located so that the maximum height $h$-M between flat surface 229 and arcuate surface 228 when measured perpendicular to surface 229 is greater than the radius R-PC and the body 226 has a length L-PC as seen in FIGS. 15 and 17. Body 226 also has a tranversely extending recess 230 thereacross which opens onto the flat surface 229. Recess 230 has a depth $d$-1 with generally flat inboard edge 231 generally parallel to surface 229 and a leading push edge 234 extending from the flat surface 229 to the bottom edge 231 and forming a shoulder 235 on body 226 The push edge 234 is located a distance $d$-3 rearwardly of the leading end 236 of body 226. That portion of body 226 spanning the recess 230 has a maximum thickness when measured perpendicular to the flat surface 228 so that body 226 has sufficient strength to allow the fastener 11 to be pulled into the holes through the work pieces by pulling on connector 225 as will become more apparent. The recess 230 has a length L-R such that the rear edge of the recess 230 is at the leading end 222 of the engagement section 219. The trailing end of body 226 is integral with the leading end 222 of engagement section 19. The radius R-PC is approximately equal to one-half the thread root diameter $d$-r so that a conventional nut may be slipped over the connector 225 and screwed onto threads 20 as will be explained.

For maintaining the fastener 211 coaxial with the pintail 212, a V-shaped notch 232 is provided in shoulder 235 which opens onto the push edge 234 at its wide end. The apex 238 of notch 232 is oriented generally normal to the central fastener axis $A_f$ and to the flat surface 229 so that one side of notch 232 opens onto the surface 229. The opposite side of notch 232 forms a continuation of the bottom edge 231 of recess 230. Thus, a pair of forwardly converging, rearwardly facing alignment faces 239 are defined on shoulder 235 in notch 232. These alignment faces 239 cooperate with pintail 212 to maintain the fastener and pintail coaxial during installation as will become more apparent.

The pintail 212 is an alongate and generally cylindrical member with a central axis $A_p$. The pintail 212 as best seen in FIGS. 12, 14, 16 and 18 has a generally cylindrical connector section 240 at its trailing end and a pulling section 241 at its leading end. The pintail 212 may be incorporated in an installation tool IT as illustrated or the pulling section 241 may be provided with an appropriate configuration to be selectively engaged by a conventional lockbolt installation gun to pull the pintail through the holes of the work pieces as described for the fastener assembly 10. The overall effective length L-P of the pintail 212 that can be projected from tool IT is greater than the thickness of the work pieces as will become more apparent so that the leading end of the pintail can be extended through the holes in the work pieces prior to installation as seen in FIG. 20.

The connector section 240 of the pintail 212 is a cylindrical section defining a generally cylindrical peripheral surface 242 thereon with a diameter d-SS seen in FIGS. 12, 14, 16 and 18 substantially equal to twice the radius R-PC of the surface 228 on the pintail connector 225 and a convenient length L-SS seen in FIG. 20. The trailing end of the connector section 240 is provided with a cutout 245 which extends forwardly from the trailing end 246 of the section 240. The cutout 245 has a length L-C substantially equal to the length L-PC of the pintail connector 225 as will become more apparent. The cutout 245 has a depth d-C substantially equal to the thickness $t$-M of that portion of the pintail connector 225 spanning recess 230. Cutout 245 defines a generally flat inside surface 248 on connector section 240 which lies along a chord of section 240 so that the longitudinal axis of surface 248 is generally parallel to the pintail axis $A_p$. Surface 248 is located so that the maximum height h-PM between the flat surface 248 and cylindrical surface 242 when measured perpendicular to surface 248 is greater than one-half the diameter $d$-SS. The cutout 245 is sized so that when surface 248 mates with edge 231, the peripheral surface 242 on section 240 of pintail 212 forms a continuation of the peripheral surface 228 on pintail connector 225 of fastener 211 as will become more apparent.

A transversely extending recess 250 best seen in FIGS. 16 and 18 is provided across connector section 240 and opens onto the surface 248. The recess 250 has a generally flat bottom edge 251 oriented so that edge 251 will mate with the flat surface 229 on pintail connector 225 when the fastener 211 and pintail 212 are coaxial as seen in FIG. 12. Recess 250 also defines a trailing pull edge 252 extending from the surface 248 to the bottom edge 251 and forming a shoulder 254 on the connector section 240 adjacent the surface 248. The pull edge 252 is located a distance $d$-4 forwardly of the trailing end 246 of the connector section 240 and mates with the push edge 234 on pintail connector 225 of fastener 211 when assembled as seen in FIG. 12. The recess 250 has a depth $d$-5 so that that portion of the connector section 240 spanning the recess 250 has a maximum thickness t-PM measured perpendicular to the bottom edge 251 of the recess 250. The recess 250 has a length L-PR such that the leading edge of the recess 250 is a continuation of surface 249 at the leading end of the cutout 245.

For maintaining coaxial alignment between fastener 211 and pintail 212, a V-shaped projection 255 is provided on the connector section 240 of pintail 212 as best seen in FIGS. 16 and 18 which co-operates with the V-shaped notch 232 in the pintail connector 225. The projection 255 extends forwardly from shoulder 254 into the recess 250 a distance $d$-6 substantially equal to the depth of notch 232 with its apex 256 lying generally normal to axis $A_p$ and the bottom edge 251 of recess 250. The exposed side of projection 255 forms a continuation of the flat surface 248 and forms forwardly facing, forwardly converging drive faces 258 thereon that mate with the alignment faces 239 in notch 232 when the fastener 211 and pintail 212 are assembled as will become more apparent.

When the shoulder 254 on the connector section 240 of the pintail 212 is inserted into the recess 230 on the pintail connector 225 as seen in FIGS. 12 and 20, the push edge 234 on the connector 225 will be aligned with the pull edge 252 on the pintail 212 so that the fastener 211 can be pulled into position in holes through work pieces by pulling on the pintail 212. As the shoulder 254 on connector section 240 of pintail 212 is inserted into recess 230 in pintail connector 225 of fastener 211, the projection 255 on pintail 212 will fit into notch 232 on fastener 211 to coaxially align the fastener 211 with pintail 212. When the pintail 212 is pulled, any loose motion between the fastener and pintail will be compensated for as the drive surfaces 258 on projection 255 on pintail 212 are forced against the alignment surfaces 239 in notch 232 on fastener 211 to maintain the fastener 211 and pintail 212 coaxial. In this position, it will be noted that the cylindrical surface 242 on the connector section 240 of the pintail 212 forms a continuation of the support surface 228 on the pintail connector 225 so that the resulting combination has an effective diameter $d$-SS approximately equal to the root diameter $d$-$r$ of the threads 20 on fastener 211.

As indicated hereinbefore, the pintail 212 may be incorporated in the tool used to install fastener 211 as best seen in FIGS. 20-24. The tool IT includes a tubular body TB partly shown in the figures which reciprocally mounts a driving member DM therein for reciprocal movement along the centerline CL-T of the tool. The pintail 212 is affixed to driving member DM for movement therewith. The body TB has an operating end OE adapted to engage the work pieces P about the holes H. A ratchet wrench RW may be captivated in the tubular body TB adjacent the operating end OE of the tool to install a nut N on the fastener 211. The wrench RW has a nut driving element DE which is rotatably mounted on the driving handle DH and provided with a ratchet mechanism so that the driving element DE can ratchet in one direction and drive in the other as the handle DH is rotated. It will be seen that the off side of the driving element DE defines an annular retaining recess RR on one of its ends projecting beyond the handle DH. The retaining recess RR is concentric about the axis of the driving element DE which coincides with the tool axis CL-T.

The tubular body TB has an annular bearing wall TBW adjacent its operating end defining a generally cylindrical wrenching chamber TBC therein concentric about centerline CL-T and opening onto the operating end OE of tool IT. The chamber TBC has a diameter such that the handle DH and driving element DE can be rotated therein. A cutout TBT is provided through wall TBW so that the handle DH can project radially therethrough and is sufficiently wide to permit the wrench RW to be operated. The end of wall TBW may be provided with an annular inwardly turned lip TBL to bear against the work pieces P about holes H.

The wrench RW is maintained in tool IT by an annular flange TBF on the inside of body TB which projects into the recess RR on the driving element DE of wrench RW to provide a loose fit therebetween so that the driving element DE is freely rotatable with respect to body TB. The driving element DE is provided with internal wrenching surfaces WS which mate with the external wrenching surfaces NWS on nut N to drive the nut. It will be noted that the wrenching surfaces WS have a length L-WS about twice the thickness of the nut N as will become more apparent.

Figure 22:
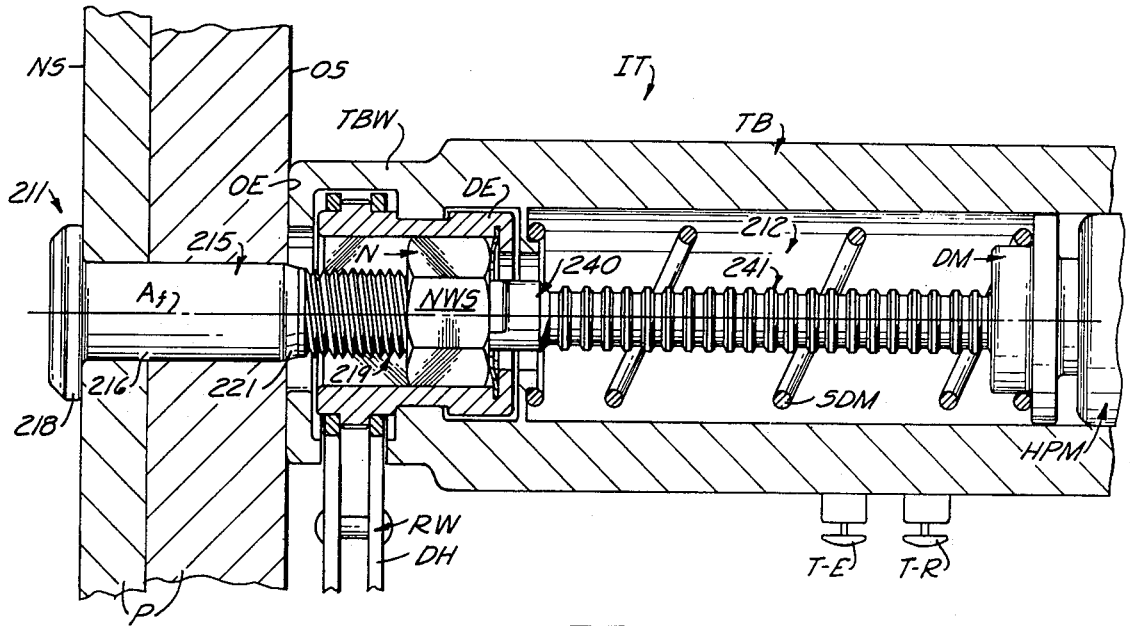
FIG. 22 is a view similar to FIG. 20 showing the third step in installing the fastener.

The driving member DM is driven by conventional means such as a hydraulic or pneumatic pressure mechanism HPM seen in FIG. 22. The pintail 212 is oriented so that the connector section 240 thereof can be selectively extended out of operating end OE of the tool IT. This allows the pintail 212 to be selectively extended through the holes H in work pieces P so that the fastener 211 can be hooked thereonto for installation. The driving member DM may be constantly urged away from the operating end OE of the installation tool IT with a small amount of force so that the tool IT will maintain tension in the connection between the fastener 211 and the pintail 212 as shown by spring SDM in FIG. 22.

Figure 21:
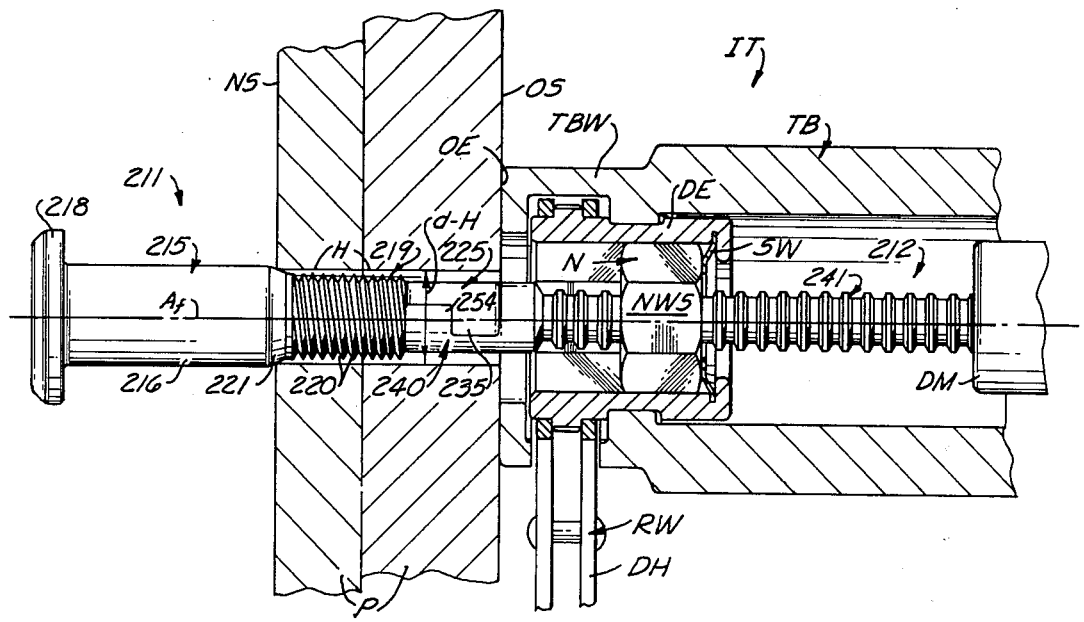
FIG. 21 is a view similar to FIG. 20 showing the second step in installing the fastener.

The installation of a fastener 211 using the tool IT can be best understood by reference to FIGS. 20-24. As seen in FIG. 20, a nut N is inserted into the driving element DE of the wrench RW over the pintail 212. The tool IT is triggered by trigger T-E in FIG. 22 to extend the connector section 240 on the pintail 212 from the operating end of the installation tool IT. The connector section 240 of the pintail 212 is inserted through the holes in the work pieces P from the off side OS thereof so that the connector section 240 on the pintail 212 projects out of the near side NS of the work pieces P opposite the installation tool IT. The fastener 211 is now hooked onto the connector section 240 so that the V-shaped projection 255 on the pintail 212 mates with the V-shaped notch 232 on the fastener 211. The mating of projection 255 with notch 232 serves to maintain the fastener 211 coaxial with the pintail 212. The pintail 212 also serves as a pilot to keep the fastener 211 generally centered within the holes H. When the trigger T-E on tool IT is released, the driving member DM is urged away from the operating end OE of the tool so that the previously mentioned small force is applied to the pintail 212 as shown by spring SDM. This small force pulls the fastener toward the holes H. If the holes H are of such a diameter $d$-H so that there will be an interference fit, the diameter of the holes will be smaller than the diameter of the bearing section of the fastener 211 and larger than the crest diameter of the threads 220. In that case, the fastener 211 will be pulled into the holes until that end of the holes H at the near side NS will engage the transition surface 221 as seen in FIGS. 12 and 21.

When the tool IT is activated through trigger T-R in FIG. 22 to apply the main pulling force, the driving member DM will be forced away from the operating end OE of the tool IT with sufficient force to pull the bearing section 215 of the fastener 211 into the holes H with the pintail 212 passing through the nut N. When the head 218 of the fastener 211 bottoms against the near side NS of the work pieces P as seen in FIG. 22, it will be seen that the leading end 22 of the engagement section 19 has now just entered the nut N. An annular spring washer SW may be provided in the driving element DE at its inboard end to resiliently urge the nut N against threads 20 so that the nut N can be started onto the threads 20 as seen in FIG. 22. When the nut N is rotated by the driving element DE, the nut will be screwed onto the threads 20. While the tool IT maintains an axial tension load on the fastener 211 through the pintail 212, the wrench RW is operated so that the driving element DE threads the nut N onto the threads 20 and tightens the nut about the fastener 211 to lock it into position as seen in FIG. 23. At this time, the major pulling force on the driving member DM is relaxed so that the connector section 240 on the pintail 212 can be unhooked from the pintail connector 225 on the fastener 211 and the tool IT removed along with the pintail 212 as seen in FIG. 24. The pintail connector 225 may be broken from the fastener 211 as described hereinbefore is the joint formed is a weight critical joint. Another nut N can then be inserted into the driving element DE and the cycle repeated to install other fasteners 211.

A first modification of fastener 211 and pintail 212 is shown in FIGS. 25-30 and designated 211' and 212'. The modification is made on the pintail connector 225' on fastener 211' and on the connector section 240' of the pintail 212'. The modification consists of means for positively holding the fastener 211' and pintail 212' together during installation. The modification of the pintail connector 225' is best seen in FIGS. 25 and 27 while the modification of the connector section 240' is best seen in FIGS. 26 and 28.

As seen in FIGS. 25 and 27, the leading end 236 of the body 226 of pintail connector 225' is cut at an angle so that it defines a leading surface 336 defining an included angle A-PC with respect to the surface 229. The surface 336 extends from the flat surface 229 to the arcuate surface 228 to form a forwardmost catch projection 338 at its juncture with the flat surface 229. The projection 338 is oriented normal to the central fastener axis $A_f$. The projection 338 co-operates with the connector section 240' to positively connect the fastener 211' and pintail 212' as will become more apparent.

As seen in FIGS. 26 and 28, the cutout 245 and recess 250 in connector section 240' on pintail 212' define a common rearwardly facing leading surface 349 which angles rearwardly from the bottom edge 251 of recess 250 defining an included angle A-P with respect to the bottom edge 251. This forms a forwardmost apex 350 at its juncture with edge 251 to receive the projection 338 on pintail connector 225' as will become more apparent. The apex 350 is oriented generally normal to the pintail axis $A_p$.

The length L-R' of the recess 230, the distance $d$-3' between projection 338 and the push edge 234 at recess 230, the length L-PR' of recess 250 along the bottom edge 251, and the distance $d$-4' between the trailing end 246 of connector section 240' and the push edge 252 are selected so that the projection 338 on fastener 211' can be inserted into the apex 350 in pintail 212' as seen in FIG. 29 when the fastener 211' is held so that its axis $A_f$ is angled with respect to the pintail axis $A_p$. In this position, the shoulder 235 and notch 232 on fastener 211' are above the shoulder 254 and projection 255 on pintail 212'. The pintail 212' is oriented so that surface 248 faces upwardly. The fastener 211' can be moved laterally until shoulder 235 and notch 232 on fastener 211' is vertically aligned with the shoulder 254 and projection 255 on pintail 212'.

The fastener 211' can then be pivoted down into alignment with pintail 212' so that their axes are coaxial as seen in FIG. 30. The weight of fastener 211' maintains the fastener and pintail in position, and projection 338 engages apex 350 to positively maintain coaxial alignment between the fastener and pintail. Any space between the push edge 234 on fastener 211' and pull edge 252 on pintail 212' will be absorbed when an axial force is exerted on pintail 212' by the installation tool IT. The remainder of the installation is similar to that described hereinabove.

A second modification of fastener 211 and 212 is illustrated in FIGS. 31-35, and designated 211" and 212". The modification is made on the pintail connector 225" of fastener 211" and on the connector section 240" on pintail 212, and consists of means for positively holding the fastener 211" and pintail 212" together during installation.

As seen in FIGS. 31 and 33, the leading end 236 on the body 226 of connector 225" defines a forwardly facing dimple 436 which co-operates with connector section 240" on pintail 212" as will become more apparent. The dimple 436 is located a prescribed distance $d$-DP from the juncture of the flat surface 229 with end 236 and is generally centered across the width of the end 236.

As seen in FIGS. 32 and 34, the connector section 240" on pintail 212" is provided with a detent assembly 449 which projects out of the rearwardly facing surface 249 formed by cutout 245. The detent assembly 449 is mounted in an axially extending hole 450 in connector section 240" which opens onto surface 249 at its rear end and is located the distance $d$-DA above the bottom edge 251 and centered across the width of the surface 249. The dimensions are selected so that the detent assembly 449 lines up with the dimple 436 on fastener 211" when the pintail and fastener are coaxial as will become more apparent. The detent assembly 449 comprises a ball detent 451 slidably mounted in hole 450 and urged toward surface 249 by a spring 452 carried in the hole 450 inboard of detent 451. The ball detent 451 is captivated in the hole 450 about the hole opening as indicated at 454 best seen in FIG. 32 in conventional manner. The ball detent 451 can project from the hole opening a prescribed distance $d$-DB seen in FIG. 34 under the urging of spring 452.

When the shoulder 235 and notch 232 on fastener 211″ are lined up with the shoulder 254 and projection 255 on pintail 212″, the shoulder 235 can be forced into recess 250. This causes the leading end 236 of pintail connector 225″ on fastener 211″ to force the ball detent 451 back into hole 450 by compressing spring 452. This allows the shoulder 235 to pass into recess 250. When the shoulder 235 is fully seated in recess 250, the dimple 436 lines up with the ball detent 451 and the spring 452 forces the detent 451 into the dimple 436 to positively maintain the shoulder 235 on fastener 211″ in the recess 250 on pintail 212″ so that the fastener and pintail are coaxial. The fastener 211″ is then installed similarly to fastener 211. The pintail 212″ can be removed from the installed fastener by reversing the above procedure.

I claim:

1. An installation tool construction for installing an elongate fastener having a bearing surface to be inserted through aligned holes in work pieces and a pintail connector on the leading end of the fastener adapted to be engaged to pull the bearing surface into the holes, said tool construction comprising:
   a pintail member having a trailing end removably connectable to the pintail connector on the fastener to pull the bearing surface of the fastener into the holes through the work pieces;
   a driving member operatively connected to said pintail member to move said pintail member therewith;
   a housing member reciprocally mounting said driving member therein for reciprocal movement of said driving member and said pintail member along a central axis, said housing defining an operating face thereon generally normal to said central axis adapted to engage one side of the work pieces about the holes and through which the trailing end of said pintail member can be selectively extended as said driving member is reciprocated;
   first driving means for selectively urging said pintail member in a first direction into said housing member with a first prescribed force to urge said pintail member toward retraction into said housing member;
   second driving means for selectively urging said pintail member in a second direction opposite said first direction to selectively extend the trailing end of said pintail member from said housing member for connection of said pintail member to said pintail connector on said fastener; and,
   third driving means for selectively urging said pintail member in said first direction with a third prescribed force greater than said first prescribed force sufficient to force the bearing surface into the holes through the work pieces when the fastener is connected to said pintail member.

2. The installation tool construction of claim 1 for installing the fastener further having a threaded engagement section adjacent the leading end thereof adapted to receive an internally treaded nut thereon to lock the fastener in position in the work pieces, wherein said installation tool further including:
   a nut driving element adapted to drivingly engage the nut rotatably mounted adjacent the operating face on said housing concentric about said central axis; and,
   rotating means for selectively rotating said nut driving element about said central axis while drivingly engaging the nut to screw the nut onto the threaded engagement section of the fastener to lock the fastener in position in the work pieces.

3. The installation tool construction of claim 2 further including nut engagement forcing means for selectively urging the nut drivingly engaged by said nut driving element into engagement with the threaded engagement section on the fastener so that the nut will be screwed onto the threaded engagement section of the fastener as said nut driving element is rotated.

4. An installation tool construction for installing an elongate fastener having a bearing surface to be inserted through aligned holes in work pieces and a threaded engagement section adjacent the leading end thereof adapted to receive an internally threaded nut thereon to lock the fastener in position in the work pieces, said installation tool comprising:
   a housing member adapted to engage one side of the work pieces about the holes;
   forcing means operatively associated with said housing member for axially forcing the bearing surface on the fastener into the holes so that the threaded engagement section projects from the work pieces;
   a nut driving element adapted to drivingly engage the nut and position the nut coaxially with the engagement section on the fastener;
   rotating means for selectively rotating said nut driving element to screw the nut onto the threaded engagement section of the fastener to lock the fastener in position in the work pieces; and,
   nut engagement forcing means for selectively urging the nut drivingly engaged by said nut driving element into engagement with the threaded engagement section on the fastener so that the nut will be screwed onto the threaded engagement section of the fastener as said nut driving element is rotated.

* * * * *